March 22, 1932.   B. N. BLETSO ET AL   1,850,492
ROD REELING MECHANISM
Filed Aug. 3, 1931     4 Sheets-Sheet 3

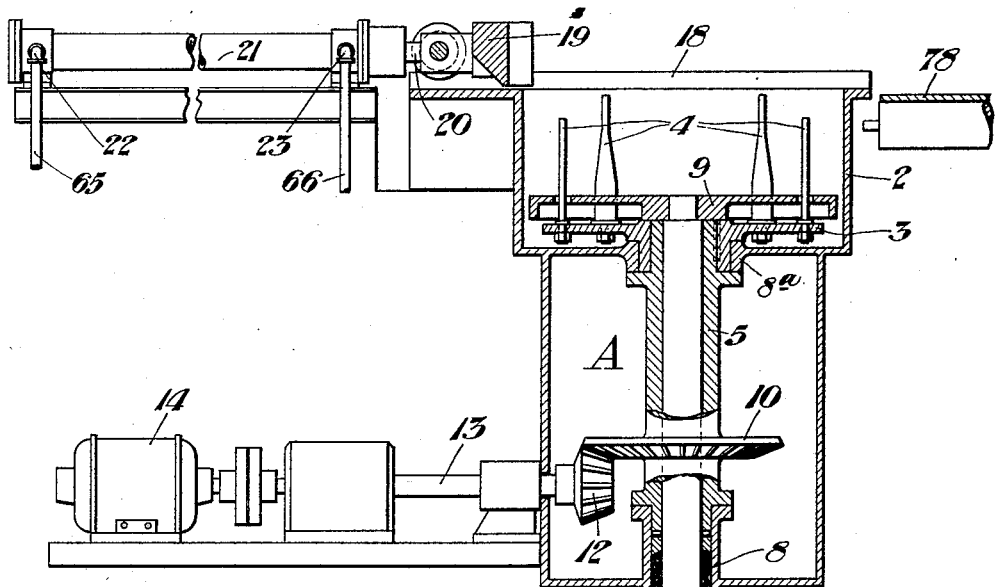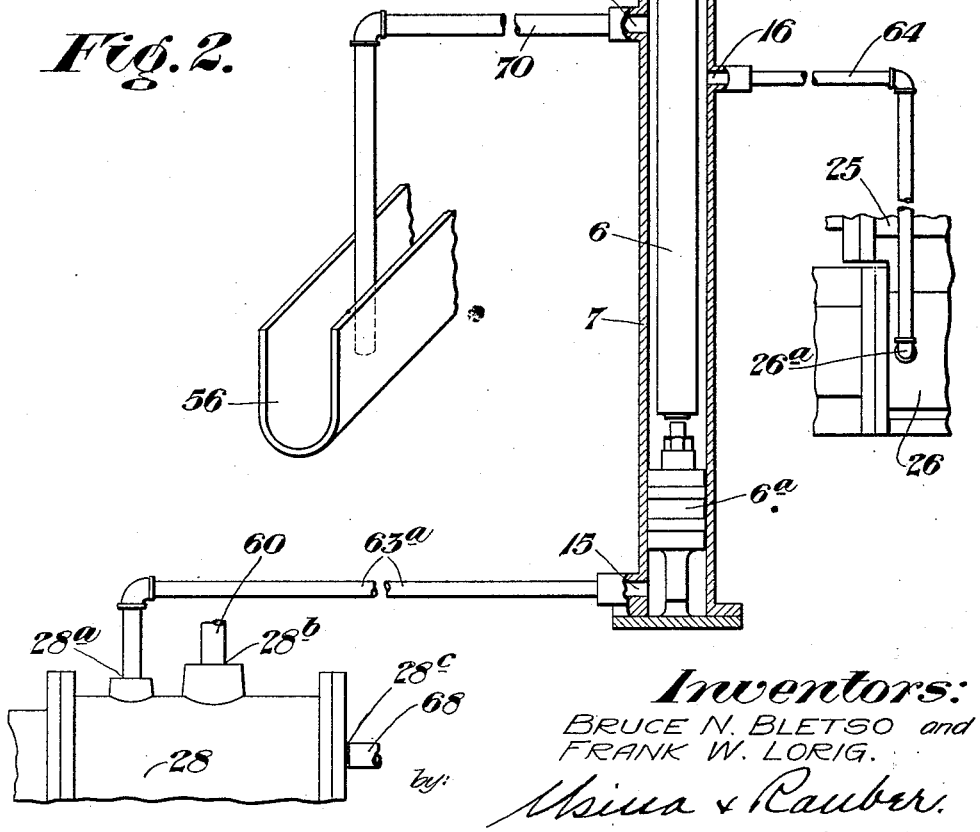
Fig.2.

Inventors:
BRUCE N. BLETSO and
FRANK W. LORIG.
by Usina & Rauber
their Attorneys

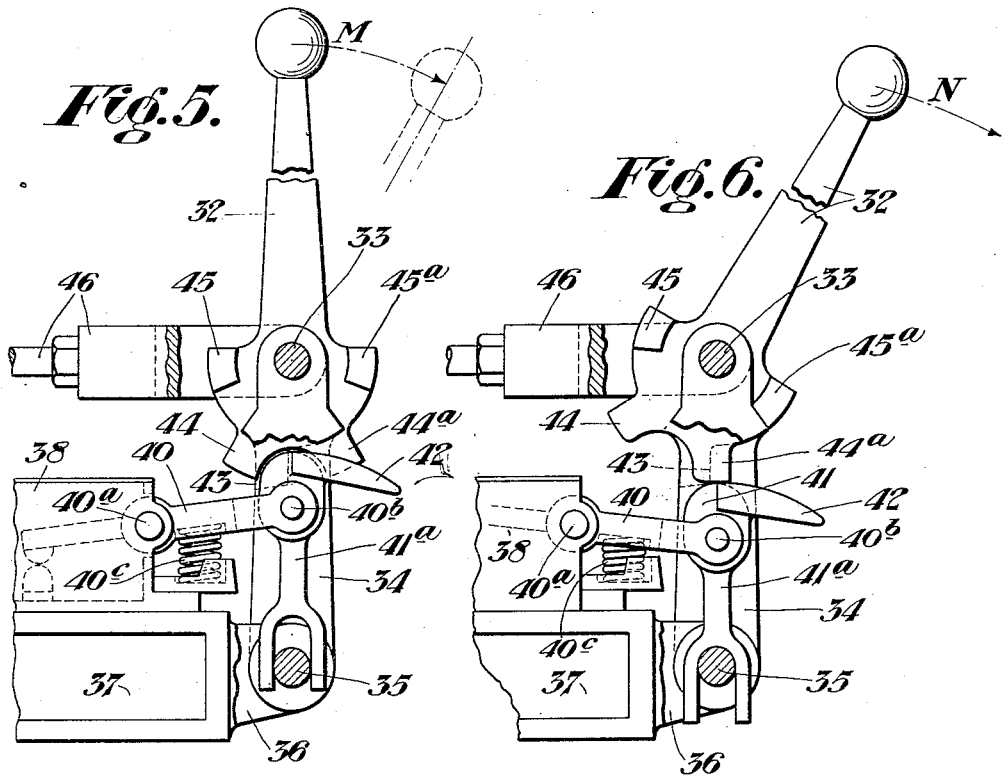
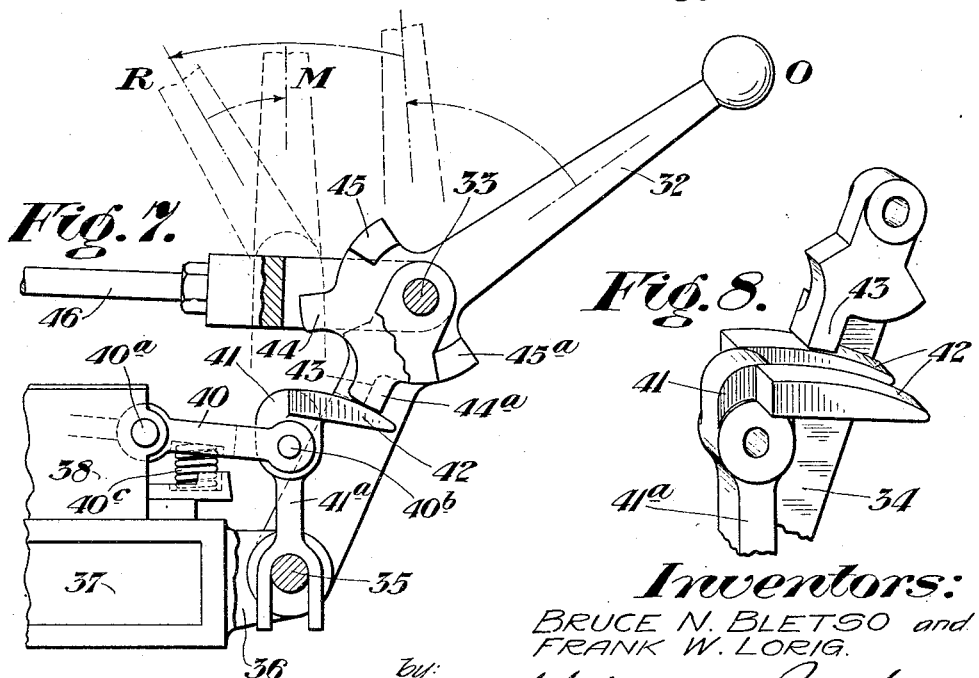

Patented Mar. 22, 1932

1,850,492

UNITED STATES PATENT OFFICE

BRUCE N. BLETSO, OF CLEVELAND HEIGHTS, AND FRANK W. LORIG, OF LAKEWOOD, OHIO

ROD REELING MECHANISM

Application filed August 3, 1931. Serial No. 554,934.

This invention relates to rod mill reels and more particularly to operating and control mechanism for rod mill reels, and has for its object the provision of such mechanism which is controlled from a single operating lever located at a point remote from the reel.

Another object is to provide a control mechanism which is interlocked so that the several mechanisms are operated in a prescribed sequence.

In the drawings:

Figure 2 is an enlarged vertical section through the rod reel.

Figure 1:
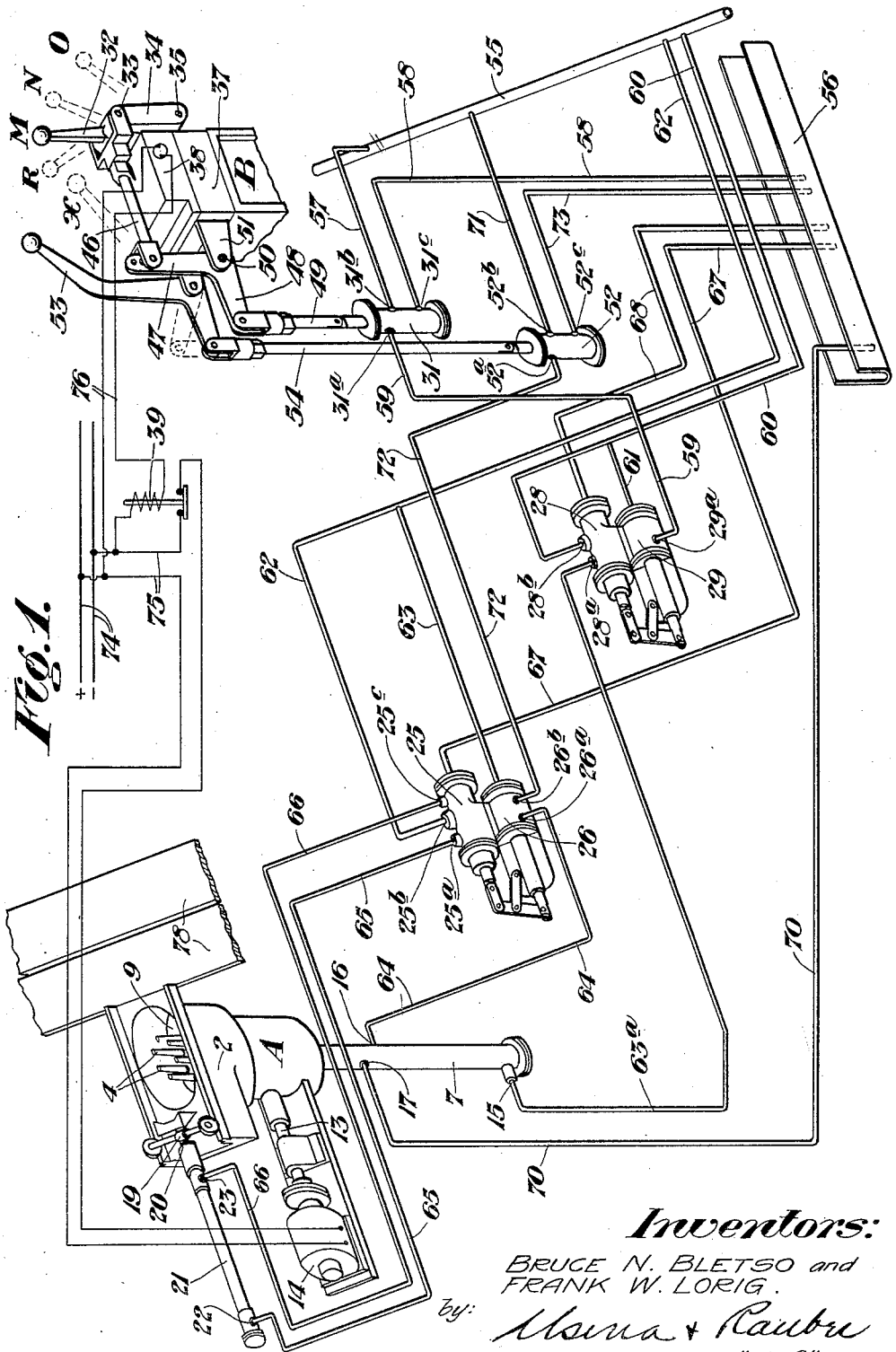
Figure 1 is a perspective diagrammatic view showing a reel and control constructed in accordance with this invention.
Figure 3:
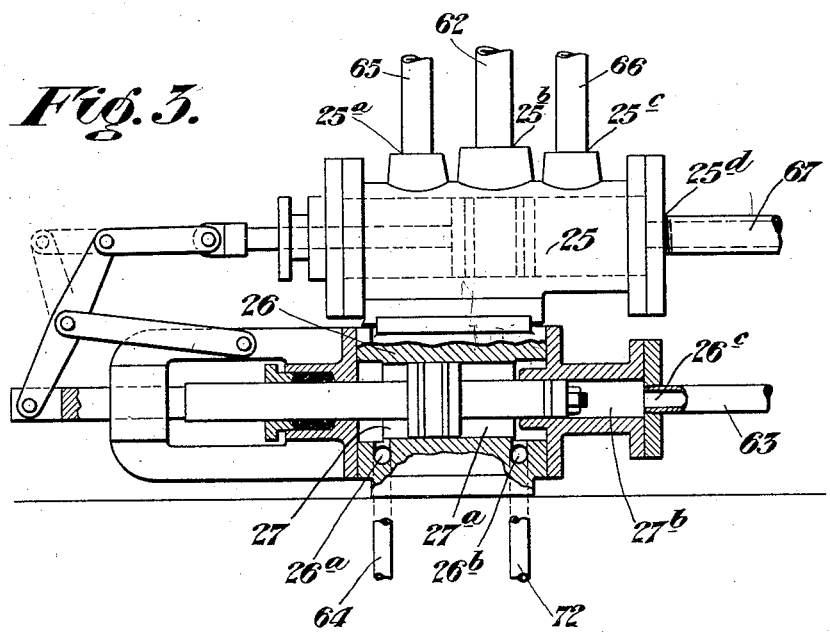
Figure 3 is an enlarged detail view, partly in section, of the compound differential cylinder operated valve used for controlling the reel.
Figure 4:
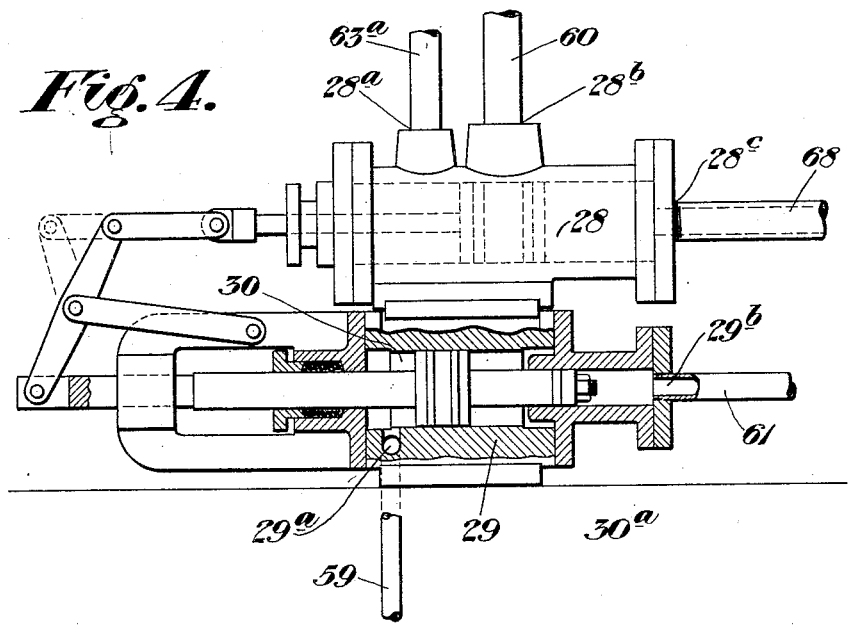
Figure 4 is a similar view of the simple differential cylinder operated valve.

Figures 5 to 7, inclusive, are enlarged detail views of the control lever in various positions.

Figure 8 is a fragmentary view showing the means for holding the cam rider head depressed when the operating lever is being shifted to some of its positions.

Referring more particularly to the drawings, the letter A designates a rod pouring reel having a housing 2, and a reeling disk 3 carrying a nest of bundle forming pins 4. The disk 3 is carried by the upper end of spindle 5 which is bored to form a guide for a plunger 6, and is carried in bearings 8 and $8^a$. The lower end of plunger 6 extends down into a hydraulic cylinder 7 which has a piston $6^a$. The disk 3 is keyed or otherwise secured to the upper end of spindle 5 so as to rotate therewith. A second disk 9 is carried on the upper end of the plunger 6 above the disk 3. The disk 9 is provided with apertures through which the pins 4 project.

A bevel gear 10 is secured to spindle 5 and is meshed with a pinion 12 carried by a shaft 13 operated by a motor 14.

The cylinder 7 is provided with ports 15, 16 and 17 for purposes to be described.

The reel housing 2 has a track 18 on its upper face on which a wheeled pusher-head 19 is adapted to travel to push the coiled rods from the disk 9 of the reel when said disk is raised to discharge position by the cylinder 7. The pusher-head 19 is carried by the plunger 20 of a hydraulic cylinder 21. The cylinder 21 has ports 22 and 23.

A four-way operating valve 25 is provided for controlling the fluid under pressure to the cylinder 21 and is provided with ports $25^a$, $25^b$, $25^c$ and $25^d$. The valve 25 is directly connected to and operable by a compound differential cylinder 26 having ports $26^a$, $26^b$ and $26^c$, and chambers 27, $27^a$ and $27^b$.

A three-way operating valve 28 is provided for controlling the fluid under pressure to the cylinder 7 and is provided with ports $28^a$, $28^b$ and $28^c$. The valve 28 is directly connected to a simple differential cylinder 29 which has ports $29^a$ and $29^b$, and chambers 30 and $30^a$.

A three-way pilot valve 31 is directly connected to a manually operated control mechanism B. The valve 31 has ports $31^a$, $31^b$ and $31^c$, connected as hereinafter described.

The control mechanism B comprises a cam lever 32 supported by a pin 33 which, in turn, is mounted in the upper ends of levers 34 and $34^a$. The levers 34 are mounted on a pin 35 mounted in a bracket 36 on a base 37. The base 37 also supports a switch 38 for making and breaking a control circuit to a magnetic or solenoid operated switch 39. The switch 38 is of the rocking type and has arms 40 which rock about a pin $40^a$, against a spring $40^c$, and are pivotally connected at their rear ends to a pin $40^b$ mounted in the head 41 of a cam rider $41^a$ which has a forked lower end engaged over pin 35 between the levers 34.

The cam rider head 41 is provided with a pair of rider arms 42 adapted to be engaged by lugs 43 on the levers 34 when said levers are moved rearwardly as will be hereinafter described. Lugs 44 and $44^a$ are provided on the lever 32 and adapted to engage the cam rider head 41 when said lever is rocked as hereinafter described. Stop lugs 45 and $45^a$ are also provided on the lever 32 and adapted to engage the levers 34 and 34ᵃ when the lever 32 is rocked beyond the vertical.

The lever 32 is connected by a connecting-rod 46 to the upper lever 47 of a bell crank, the other lever 48 of which is connected by a connecting-rod 49 to the pilot valve 31. The bell crank is supported on a pin 50 in brackets 51 on the base 37.

A three-way emergency pusher control pilot valve 52 is provided adjacent the valve 31 and control B. The valve 52 is provided with ports 52ᵃ, 52ᵇ and 52ᶜ, and is directly connected to a manually operated crank-lever 53 by a connecting rod 54.

A constant pressure fluid header 55 is provided to supply fluid under pressure to the several reel elements and a drain 56 is also provided.

The several reel elements and valves are connected as follows:

A pipe 57 connects the supply header 55 to the port 31ᵇ of the pilot valve 31 and a pipe 58 connects the port 31ᶜ of valve 31 to the drain 56. A pipe 59 connects the port 31ᵃ of valve 31 to the port 29ᵃ of cylinder 29.

A pipe 60 connects the supply header 55 to port 28ᵇ of the three-way valve 28 and a branch pipe 61 leads from the pipe 60 to the port 29ᵇ of the cylinder 29.

A pipe 62 connects the supply header 55 to the port 25ᵇ of valve 25, and a branch pipe 68 leads from the pipe 62 to the port 26ᶜ of the compound differential cylinder 26.

A pipe 63ᵃ connects the three-way operating valve port 28ᵃ to the port 15 of the reel lift cylinder 7.

A pipe 64 connects the port 26ᵃ of compound differential cylinder 26 to the port 16 of cylinder 7.

A pipe 65 connects port 25ᵃ of valve 25 with the port 22 of pusher cylinder 21; a pipe 66 connects the port 25ᶜ of valve 25 with the port 23 of pusher cylinder 21, and a pipe 67 connects port 25ᵈ of valve 25 to the drain 56.

A pipe 68 connects the port 28ᶜ of valve 28 to the drain 56, and pipe 70 connects the port 17 of the lift cylinder 7 to the drain 56.

A pipe 71 connects the supply header 55 to the port 52ᵇ of the valve 52; a pipe 72 connects the port 52ᵃ of the valve 52 to the port 26ᵇ of the compound differential cylinder 26, and a pipe 73 connects the port 52ᶜ to the waste drain 56.

A power line is designated by the numeral 74 and branch lines 75 are led from the line 74 to the motor 14. One of the lines 75 is led through a solenoid operated switch 39. The coil of the solenoid switch 39 is energized by a control circuit through the lines 76 and switch 38.

The apparatus above described is such as will stop the reel A, lift the disk 9 and operate the pusher to push the coiled rod bundle from the reel onto the conveyer table indicated at 78.

The operation of the apparatus above described is as follows:

Cam lever 32 being in position M and reel is in operation. Movement of the lever 32 to position N will cause the lever to pivot about the pin 33 and force the lug 44ᵃ to ride over the head 41 of the cam rider 41ᵃ so as to depress the cam rider and switch arms 40 against the spring 40ᶜ, thus operating the pilot switch 38 and deenergizing the solenoid switch 39 to break the circuit to the motor 14 and stopping the reel.

The cam lever 32 is then moved to position O, and due to the stop lug 45ᵃ being in engagement with the levers 34 at the termination of the first lever movement, the levers 34 will be compelled to follow the cam lever in its movement to position O. The levers 34 will pivot about the pin 35 and operate the pilot valve 31 by means of connecting-rod 46, crank lever 47 and connecting-rod 49. As the levers 34 move rearwardly the lugs 43 on the levers will move over the cam arms 42 and serve to hold the cam rider 41ᵃ depressed.

The operation of the pilot valve 31 by the movement of the lever 32 and levers 34 into position O causes fluid pressure to flow from the header 55 by means of pipe 57, valve ports 31ᵇ, 31ᵃ, pipe 59 and simple differential cylinder port 29ᵃ into cylinder chamber 30, opposing constant fluid pressure in the cylinder chamber 30ᵃ, which is supplied to the chamber from the header 55 by means of the pipes 60 and 61 and port 29ᵇ.

The entry of fluid pressure to the simple differential cylinder chamber 30 causes the piston to move and by means of the direct connection operate the three-way valve 28 so as to permit fluid under pressure to flow from the header 55 to the reel lift cylinder 7 by means of pipe 60, ports 28ᵇ and 28ᵃ of valve 28, pipe 63ᵃ and cylinder port 15.

Admission of fluid under pressure to the cylinder 7 through the port 15 will cause the piston 6ᵃ to move upwardly, thereby lifting the reel disk 9. When the piston 6ᵃ has moved to its uppermost limit it will uncover the port 16 and permit fluid under pressure to flow through the pipe 64 and port 26ᵃ into the chamber 27 of the compound differential cylinder 26.

The fluid entering the chamber 27 of the cylinder 26 will oppose the constant fluid pressure in the chamber 27ᵇ of the cylinder 26 which is supplied from the header 55 by means of the pipe 62 and 63 and port 26ᶜ. The fluid entering the chamber 27 causes the piston to move to the right which by direct connection operates the four-way operating valve 25, permitting fluid pressure to flow from the header 55 into the rear end of the rod pusher cylinder 21 by means of pipe 62, ports 25ᵇ and 25ᵃ of valve 25, pipe 65 and pusher cylinder port 22, thus operating the cylinder 21 to move the pusher head 19 forwardly and push the coiled rod from the reel onto the conveyer bed 78. As the cylinder 21 is operated in the forward direction the fluid in the forward end of the cylinder will be discharged through the port 23, pipe 66, ports 25$^c$ and 25$^d$ of valve 25, and pipe 67 to drain 56.

After the above operation which unloads the coiled rod from the reel, the cam lever 32 is moved to the position R. The first part of the reverse movement causes the lever 32 to pivot about the pin 33, until stop lugs 45 engage the lower levers 34. The cam rider 41$^a$ and pilot switch 38 are unaffected by this movement, due to the fact that lugs 43 on the levers 34 are over the arms 42 of the cam rider. The continued reverse movement of the lever 32 will cause the lower levers 34 to move with the lever 32 as a unit pivoting about the pin 35. When the cam lever 32 has reached its position R, the levers 34 will have resumed their vertical position moving the lugs 43 from the arms 42 and reversing the pilot valve 31 through connecting rod 46 and bell-crank lever 48 and connecting-rod 49. The pilot switch 38 still remains open, however, due to the fact that lug 44 on the lever 32 is moved over the head 41 of cam rider 41$^a$ before the lugs 43 are moved from the arms 42.

The reversal of the pilot valve 31 moves the valve to waste position, permitting fluid pressure in the simple differential cylinder chamber 30 to waste through port 29$^a$, pipe 59, ports 31$^a$ and 31$^c$ of pilot valve 31, and pipe 58 to drain 56.

With the establishing of the above communications the fluid pressure in the chamber 30$^a$ of the cylinder 29 will act to cause the piston to move to the left and by direct connections operate the three-way valve 28 to its waste position. When the valve 28 is operated as above described the fluid in the reel lift cylinder 7 will waste to the drain 56 through the port 15, pipe 63$^a$, ports 28$^a$ and 28$^c$ of valve 28, and pipe 68.

As the pressure is released from the reel lift cylinder 7 the piston 6$^a$ will be moved downward by gravity, thus closing port 16 and releasing the pressure in the compound differential cylinder chamber 27, through cylinder port 26$^a$, pipe 64, reel lift cylinder ports 16 and 17, and pipe 70.

With the waste of the fluid pressure from the chamber 27 of cylinder 26, the constant fluid pressure in chamber 27$^b$ will act to cause the piston to move to the left, and by the direct connections operate the four-way valve 25 to permit fluid pressure from the header 55 to flow through the pipe 62, ports 25$^b$ and 25$^c$ of valve 25, and pipe 66 to the front end of pusher cylinder 21 through port 23, thus reversing pusher cylinder 21 to retract the pusher head 19. The fluid from the rear end of the cylinder 21 will be wasted through port 22, pipe 65, ports 25$^a$ and 25$^d$ of valve 25, and pipe 67 to drain 56.

The pusher head being retracted, the lever 32 is then returned to its initial position M, causing it to pivot about pin 33, and thus moving lug 44 from over the cam rider head 41 and permitting the switch arm 40 to raise to contact or circuit making position. The making of the control circuit by the pilot switch 38 will energize the coil of switch 39, thereby attracting the bridge contact element of this switch and completing the power circuit to motor 14 which is again started to rotate the reel.

During the forward movement of the pusher it may become necessary, due to interference, to stop or retard the operation of the pusher. This is accomplished by the operator pulling the emergency pusher control lever 53 down into the position X, which will operate the three-way pilot valve 52 and permit fluid under pressure to flow from the header 55, through pipe 71, ports 52$^b$ and 52$^a$ of valve 52, pipe 72, and port 26$^b$ of cylinder 26 into the chamber 27$^a$ of said cylinder. The admission of the fluid under pressure to the chamber 27$^a$ will balance the fluid pressure in the chamber 27 and permit the fluid pressure in the chamber 27$^b$ to act, causing the piston to move to the left so as to shift the valve 25 and permit fluid pressure to flow from the header 55 through pipe 62, ports 25$^b$ and 25$^c$ of valve 25, and pipe 66 to the pusher cylinder port 23. The admission of fluid through the port 23 will cause the piston of the cylinder 21 to move rearwardly retracting the pusher head 19. As the piston in the cylinder 21 moves rearwardly the fluid in the rear of the piston will be wasted through the port 22, pipe 65, ports 25$^a$ and 25$^d$ of valve 25, and pipe 67 to drain 56. If the pusher operating cylinder 21 has not been operated to advance the pusher head 19 prior to the operation of the lever 53 the operation of the lever 53 will simply serve to maintain pressure in the forward end of the cylinder 21 and prevent operation of said cylinder.

When the lever 53 is returned to its normal position the valve 52 will be moved to its waste position, releasing the pressure in chamber 27$^a$ of cylinder 26 by wasting the fluid into drain 56 through the port 26$^b$, pipe 72, ports 52$^a$ and 52$^c$ of valve 52 and pipe 73. With the wasting of the fluid from the chamber 27$^a$ of cylinder 26, the fluid pressure in the chamber 27 of cylinder 26 will resume its action and the apparatus will resume its normal operation.

It will be noted that the reel lift and reel motor control remains unaffected by manipulation of the emergency control lever 53. Therefore the reel disk can be raised or lowered without affecting the pusher mechanism as long as the lever 53 remains in the position X.

While we have shown and described one specific embodiment of our invention, it will be understood that we do not wish to be limited thereto since various modifications may be made without departing from the scope thereof, as defined in the appended claims.

We claim:

1. The combination with a rod pouring reel having a vertically movable disk and a fluid pressure operated cylinder for raising said reel disk to discharge position, and having an electric motor operated means for rotating said reel and a fluid pressure cylinder operated pusher for pushing the coiled rod from the said reel when said reel is elevated to discharge position, of a switch for controlling the circuit to said electric motor for rotating said reel, a fluid pressure cylinder operated valve for controlling the supply of fluid to said fluid operated cylinder for raising said reel to discharge position, a fluid pressure cylinder operated valve for controlling the supply of fluid to said fluid pressure cylinder for operating said pusher, means operable by said fluid pressure cylinder for raising said reel for controlling the supply of fluid to said fluid pressure cylinder operating said valve for controlling the supply of fluid to said cylinder operating said pusher, a pilot valve for controlling the flow of fluid to said fluid pressure cylinder for operating said valve for controlling the supply of fluid to said cylinder for raising said reel to discharge position, and means actuated by a single hand operated control lever for operating said switch and said pilot valve.

2. The combination with a rod pouring reel having a vertically movable disk and a fluid pressure operated cylinder for raising said reel disk to discharge position, and having an electric motor operated means for rotating said reel and a fluid pressure cylinder operated pusher for pushing the coiled rod from said reel when said reel is elevated to discharge position, of a switch for controlling the circuit to said electric motor for rotating said reel, means for controlling the supply of fluid to said fluid operated cylinder for raising said reel to discharge position, means operable by said fluid operated cylinder for raising said reel for controlling the flow of fluid to said cylinder for operating said pusher, and means actuated by a single hand operated control lever for operating said switch and said means for controlling the supply of fluid to said cylinder for raising said reel.

3. The combination with a rod pouring reel having a vertically movable disk and a fluid pressure operated cylinder for raising said reel disk to discharge position, and having an electric motor operated means for rotating said reel and a power operated pusher for pushing the coiled rods from said reel, of a switch for controlling the circuit to said motor, means for controlling the flow of fluid to said cylinder, means operable by said cylinder for controlling the operation of said pusher, and means actuated by a single lever for operating said switch and for controlling the operation of said means for controlling the flow of fluid to said cylinder.

4. The combination with a rod pouring reel having a vertically movable disk and power means for raising said reel disk to discharge position, and having separate power means for rotating said reel and a power operated pusher for pushing the coiled rods from said reel, of means for controlling the operation of said power means for rotating said reel, means for raising said reel, means operable by said power means for raising said reel for controlling the operation of said power operated pusher, and means actuated by a single lever for operating said means for controlling the operation of said power means for rotating said reel and said means for controlling the operation of said power means for raising said reel.

5. The combination with a rod pouring reel having a vertically movable disk and a fluid pressure operated cylinder for raising said reel disk to discharge position, of a fluid pressure operated pusher for pushing the coiled rod from said reel, and means operable by said cylinder for raising said reel for controlling the operation of said pusher.

6. The combination with a rod pouring reel having a vertically movable disk and a fluid pressure operated cylinder for raising said reel disk to discharge position, and having an electric motor operated means for rotating said reel and a fluid pressure cylinder operated pusher for pushing the coiled rod from said reel when said reel is elevated to discharge position, of a switch for controlling the circuit to said electric motor for rotating said reel, a fluid pressure cylinder operated valve for controlling the supply of fluid to said fluid operated cylinder for raising said reel to discharge position, a fluid pressure cylinder operated valve for controlling the supply of fluid to said fluid pressure cylinder for operating said pusher, means operable by said fluid pressure cylinder for raising said reel for controlling the supply of fluid to said fluid pressure cylinder operating said valve for controlling the supply of fluid to said cylinder operating said pusher, a pilot valve for controlling the flow of fluid to said fluid pressure cylinder for operating said valve for controlling the supply of fluid to said cylinder for raising said reel to discharge position, and hand-operated means for operating said switch and said pilot valve.

7. The combination with a rod pouring reel having a vertically movable disk and a fluid pressure operated cylinder for raising said reel disk to discharge position, and having an electric motor operated means for rotating said reel and a fluid pressure cylinder operated pusher for pushing the coiled rod from said reel when said reel is elevated to discharge position, of a switch for controlling the circuit to said electric motor for rotating said reel, means for controlling the supply of fluid to said fluid operated cylinder for raising said reel to discharge position, means operable by said fluid operated cylinder for raising said reel for controlling the flow of fluid to said cylinder for operating said pusher, and means for operating said switch and said means for controlling the supply of fluid to said cylinder for raising said reel.

8. The combination with a rod pouring reel having a vertically movable disk and a fluid pressure actuated means for raising said reel disk to discharge position, an electric motor operated means for rotating said reel, and a fluid pressure operated pusher for pushing the coiled rods from said reel, of means for controlling the flow of fluid to said reel raising means, and means for making and breaking the circuit to said electric motor operated means for rotating said reel, said last two named means being interlocked so as to break the circuit to said motor before admitting fluid to said reel raising means.

9. The combination with a rod pouring reel having a vertically movable disk and a fluid pressure actuated means for raising said reel disk to discharge position, an electric motor operated means for rotating said reel, and a fluid pressure operated pusher for pushing the coiled rods from said reel, of means for controlling the flow of fluid to said reel raising means, and means for making and breaking the circuit to said electric motor operated means for rotating said reel, said last two named means being interlocked so as to break the circuit to said motor before admitting fluid to said reel raising means, and means operated by said reel raising means for admitting fluid to said fluid pressure operated pusher.

10. The combination with a rod pouring reel having a vertically movable disk and pressure actuated means for raising the reel disk to discharge position and a fluid pressure operated pusher, of means for controlling the flow of fluid under pressure to said fluid pressure operated means for raising said reel, means operated by said fluid pressure operated means for raising said reel for controlling the flow of fluid under pressure to said pusher, and means independent of said fluid pressure operated means for raising said reel for controlling the flow of fluid under pressure to said pusher whereby said pusher may be stopped or reversed in an emergency without operating said reel raising means.

11. The combination with a rod pouring reel having a vertically movable disk and a fluid pressure actuated means for raising said reel disk to discharge position, a fluid pressure actuated means for pushing the coiled rods from said reel, an electric motor operated means for rotating said reel, of a switch for controlling said motor, and means actuated by a single lever for operating switch and controlling the operation of said means for controlling the flow of fluid to said pressure actuated means for raising said reel and pushing the coiled rod from said reel.

In witness whereof, we have hereunto set our hands.

BRUCE N. BLETSO.
FRANK W. LORIG.